United States Patent [19]

Casper et al.

[11] Patent Number: 5,548,791
[45] Date of Patent: Aug. 20, 1996

[54] INPUT/OUTPUT CONTROL SYSTEM WITH PLURAL CHANNEL PATHS TO I/O DEVICES

[75] Inventors: Daniel F. Casper, Poughkeepsie; Steven G. Glassen, Wallkill; Marten J. Halma, Poughquag, all of N.Y.; Sandra K. Ryan, Rochester, Minn.

[73] Assignee: International Business Machines Corporation, Armonk, N.Y.

[21] Appl. No.: 279,581

[22] Filed: Jul. 25, 1994

[51] Int. Cl.⁶ .................................................. G06F 13/14
[52] U.S. Cl. .................. 395/858; 395/859; 364/238.3
[58] Field of Search ................................. 395/858, 859, 395/275, 325, 700, 872, 826, 823, 825, 873, 841, 200.3, 856, 457

[56] References Cited

U.S. PATENT DOCUMENTS

| | | | |
|---|---|---|---|
| 3,639,909 | 2/1972 | Hauck et al. | 395/858 |
| 3,693,161 | 9/1972 | Price et al. | 395/858 |
| 3,725,864 | 4/1973 | Clark et al. | 395/826 |
| 4,060,849 | 11/1977 | Bienvenu et al. | 395/858 |
| 4,207,609 | 6/1980 | Luiz et al. | 395/858 |
| 4,224,667 | 9/1980 | Lewis et al. | 395/826 |
| 4,396,984 | 8/1983 | Videki, II | 395/858 |
| 4,415,970 | 11/1983 | Swenson et al. | 395/457 |
| 4,435,755 | 3/1984 | Meritt | 395/858 |
| 4,663,706 | 5/1987 | Allen et al. | 395/200.13 |
| 4,803,622 | 2/1989 | Bain, Jr. et al. | 395/825 |
| 4,807,121 | 2/1989 | Halford | 395/873 |
| 4,901,232 | 2/1990 | Harrington et al. | 395/826 |
| 4,922,410 | 5/1990 | Morikawa et al. | 395/823 |
| 5,014,194 | 5/1991 | Itoh | 395/823 |
| 5,070,477 | 12/1991 | Latif et al. | 395/841 |
| 5,088,025 | 2/1992 | Fujimoto | 395/872 |
| 5,274,773 | 12/1993 | Squires et al. | 395/858 |
| 5,388,217 | 2/1995 | Benzschawel et al. | 395/856 |

FOREIGN PATENT DOCUMENTS 2-294756  12/1990  Japan .

*Primary Examiner*—Thomas C. Lee
*Assistant Examiner*—Duo Chen
*Attorney, Agent, or Firm*—Lynn L. Augspurger

[57] ABSTRACT

A data processing system includes a host processor and host memory means. The processor interacts with a plurality of peripheral units through an I/O system that includes a plurality of channels, one or more I/O processors (IOP's), and control data in a system area of the host memory means. Each channel has an associated busy bit in a vector, and is provided with a one position queue for dispatching work to the channel. Each queue has a bit in a vector indicating its full or empty status. A very efficient algorithm for the assignment of work for peripherals by the IOP's is provided in a system that provides for multiple paths through multiple channels between the host and a particular peripheral using the busy vector and queue vector.

8 Claims, 6 Drawing Sheets

INPUT/OUTPUT CONTROL SYSTEM WITH PLURAL CHANNEL PATHS TO I/O DEVICES

BACKGROUND OF THE INVENTION

1. Field of the Invention

The present invention relates to a data processing system, and more particularly to a path selection system where multiple channel paths are available for controlling an Input/Output (I/O) device by a host computer.

2. Description of the Prior Art

The present invention finds use in a data processing system such as one produced by International Business Machines Corp. and referred to as an ES/9000. This data processing system is configured to comply with an architecture defined in "IBM System ESA/390 Principles of Operation", SA22-7201.

FIG. 1 will be referred to for describing the existing method of dispatching work to a particular I/O device through multiple channel paths between the I/O device and a host computer in response to I/O instructions executed in host processors.

The data processing system includes a host computer comprised of a host processor which may include one or more Central Processing Units (CPU) 10 and a host memory 11. Host memory 11 is comprised of a main store 12, addressable by program instructions, and a system store 13. System store 13 stores various control data and is only available to various hardware components and microcode of the system and not available to program instructions.

The input/output system includes a plurality of I/O devices 14 which are normally controlled by control units (CU) 15. An I/O controller includes a plurality of channels 16, multichannel communicator buffer (MCB) 17, and one or more Input/Output Processors (IOP) 18. The connection of the I/O system to the host computer is effected and controlled by a bus switch 19 and system control element (SCE) 20.

A basic ES/9000 system can be configured with one host memory 11, CPU 10, SCE 20, bus switch 19, MCB 17, and IOP 18 and channel 16. As depicted in FIG. 1, a system can also be configured with two sides, each with plural CPU's 10 and IOP's 18. The two sides can be made independent of each other or configured into one system. Also indicated by line 21 is the situation where a CU 15 can also communicate with an autonomous system unrelated to that shown in FIG. 1.

In accordance with the ESA/390 architecture, each I/O device is assigned a unique number called a subchannel (SCH) number. There can be as many as 65,536 unique devices assigned. I/O devices 14 are identified by SCH numbers in I/O instructions executed in CPU 10. Each of one or more IOP's 18 has an associated IOP work queue in system store 13. As I/O instructions are executed, the request for I/O work identified by the SCH number of the involved I/O device is stored in the work queue of an IOP. The IOP examines its work queue on a first in first out basis.

Each SCH has associated data in the system store 13 called subchannel control data (SCD). The SCH number stored in the work queue of an IOP identifies the location of the SCD. For purposes of this invention, part of the control data in the SCD includes from one to eight channel path ID's (CHPID). The CHPID identifies a physical path through a channel 16 to the CU 15 and thus I/O device 14. As shown in FIG. 1, and in particular with regard to the CU identified generally at 22, three channel paths are available. The SCD for a device on CU 22 will contain CHPID's 0, 127, and 128. This data is stored in the SCD at the time the system is initialized, and will include a rotation order for examining the status of these channels when an IOP attempts path selection to send the I/O work to a selected channel 16.

Based on anticipated use of the data processing system, certain control data in system store 13 is fixed. For the present invention that includes which IOP work queues may receive the indication of work in the form of a SCH number when an I/O instruction is executed, which of the channels 16 are to be controlled by a particular IOP 18, the CHPID's for a SCH, and the order in which CHPID's are examined for path selection.

When an IOP 18 examines its work queue and identifies work to be performed by the presence of a SCH number, it accesses the SCD of the SCH. The basic function of path selection is to find a non-busy channel designated by the CHPID's. Before doing the path selection, CHPID's are eliminated from the path selection process by examining other control data that indicates the busy/non-busy status of the I/O devices 14 and CU's 15 identified by the SCH number. If these elements are already busy from previous activations, the path selection will be modified.

The IOP will attempt to select the channel which is next in rotation order as designated by the SCD. When an IOP attempts to select a channel, it checks if the channel is busy. If the channel is available, the IOP sends a signal to the channel to do the I/O work. If the channel is busy, the IOP attempts to select the next path in the round robin rotation order. In the case of multiple IOP's, each IOP is assigned a group of channels for which it can test the busy status. If the next path in the rotation order is not part of this IOP's group, the IOP enqueues the I/O work on the work queue of the IOP who has this next channel path as part of its group. When the request gets to the front of this IOP's work queue, the channel path selection process is started again. If all the paths to the device have a busy condition and at least one path has a busy channel, the IOP puts the I/O work at the end of its work queue. When the IOP has serviced all the requests in its queue in front of the requeued request, it again tries to find a free path to the device and the whole channel selection process starts again.

Problems result in systems where there are many channels and high I/O usage. The path selection algorithm outlined above can result in very high IOP activity and bus usage without getting the I/O work requested dispatched to a selected channel. By having to transfer I/O work between IOP work queues and putting this work at the end of the queues, a window where a channel may change from busy to not busy could easily be missed. Only by providing more IOP's at additional cost can this problem be potentially alleviated with the present path selection technique.

SUMMARY OF THE INVENTION

It is a principal object of the invention to improve the channel path selection technique of a data processing system by giving IOP's increased ability to test the busy/not busy status of channel paths to an I/O device.

It is another object of the invention to improve the channel path selection technique of a data processing system by providing a one-deep channel queue for I/O work at each of the one or more channels connected to an I/O device.

A further object of the invention is to improve the path selection technique of multiple IOP's in a data processing system by allowing the IOP's to determine the full/not full status of a one-deep channel queue at each of one or more channels connected to an I/O device.

These and other objects are achieved in a data processing system that includes a host computer with one or more host processors and host memory that interact with a plurality of I/O devices through a plurality of channels under control of one or more Input/Output Processors (IOP's). Each channel is provided with a one-deep queue for receiving an indication of I/O work when it is already busy executing previously received work. When an I/O device is accessible to the host computer through multiple channels, the IOP's are provided with increased channel path selection ability by allowing the IOP's to test the busy/not busy status of each channel and the full/not full status of a channel's one-deep queue. This enhances the ability of each IOP to initiate work in the channels, or select the best IOP to make the next path selection determination.

DETAILED DESCRIPTION OF INVENTION

The basic components of a data processing system incorporating the present invention have been previously described in connection with FIG. 1. FIG. 2 continues the description of the background of the present invention by describing the basic steps involved in the execution of an I/O instruction by a CPU 10. Details of the steps in executing an I/O instruction are found in the architecture defined in the above identified Principals of Operation.

Generally, an I/O instruction is executed with an I/O device 14 identified by its unique subchannel (SCH) number contained in the R1 general purpose register 23 of CPU 10.

The I/O instruction includes an operation code 24 such as Start Subchannel, and an ORB Address 25 that addresses main store 12 for a previously program created Operation Request Block (ORB) 26. The ORB 26 includes a Channel Program Address which addresses main store 12 to obtain one or more channel control words (CCW's) which include the operations to be performed by the I/O device 14 and the main store 12 address of data that may be involved in the operation.

Figure 1:
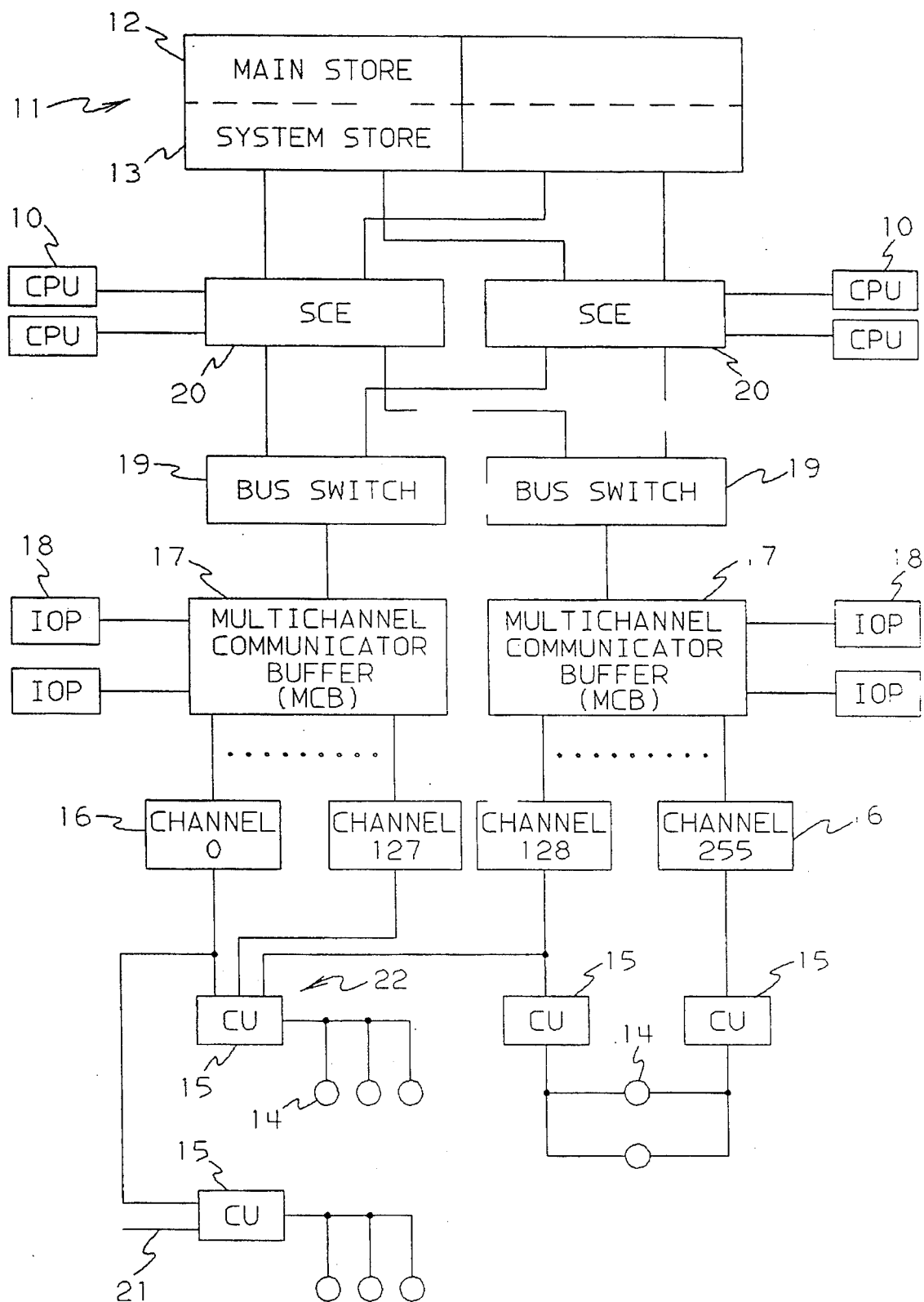
FIG. 1 is a block diagram of a data processing system forming the environment for the present invention.
Figure 2:
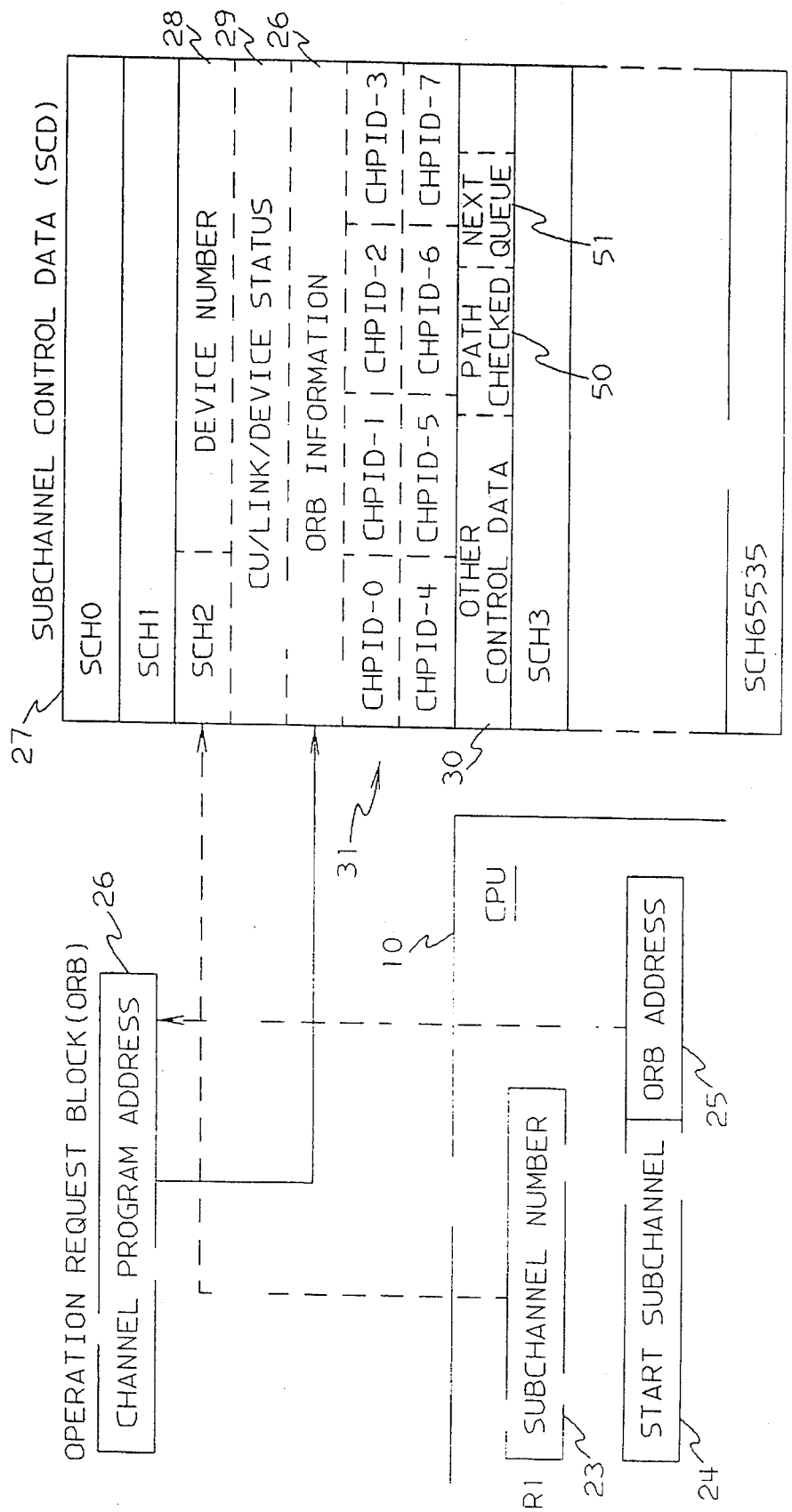
FIG. 2 is a block diagram showing various control blocks in a system memory of the data processing system of FIG. 1 for practicing the present invention.

The system store 13 of host memory 11 shown in FIG. 1 includes a number of blocks of control data which can be addressed by the microprogramming and/or hardware of various units of the data processing system. Execution of I/O instruction in CPU 10 involves accessing a number of these control blocks which direct how the I/O operation will be performed.

The designation of a SCH number in register 23 ultimately provides access to several specific control data blocks associated with the corresponding I/O device 14. In FIG. 2 these various control blocks are collectively represented by Subchannel Control Data (SCD) 27 stored in the system store 13 of host memory 11. Up to 65,536 subchannels can be designated.

Some of the control data in an SCD 27 is shown in FIG. 2 and is associated with SCH 2. Each SCH that also has an associated I/O device assigned to it also contains a system-unique parameter called the Device Number 28. System operators normally communicate with the system by using the assigned Device Number 28. Therefor, an I/O device 14 is uniquely identified by either a SCH number or Device Number 28.

SCD 27 also contains CU/Link Status data 29 and Other Control Data 30. This is a collective term for control data associated with the busy/non-busy status of links, CU's 15, devices 14, operability/connection of specified channel paths, and other information to be discussed. Reference to the SCH number, and access to the associated SCD 27 also provides the previously mentioned ORB 26 which locates the CCW's of a channel program.

Included in the SCD 27 of each SCH such as SCH2 in FIG. 2, are up to eight channel path ID's (CHPID-0 through CHPID-7) shown generally at 31. If SCH2 is associated with an I/O device 14 attached to CU 22 of FIG. 1, three CHPID's would be identified. Namely 0, 127, and 128. The sequence for testing the busy/non-busy status of CHPID's 0, 127, and 128 is specified by the placement order in CHPID's 0–2. That is, the testing could be in the order 0, 128, 127, or some other order.

Figure 3:
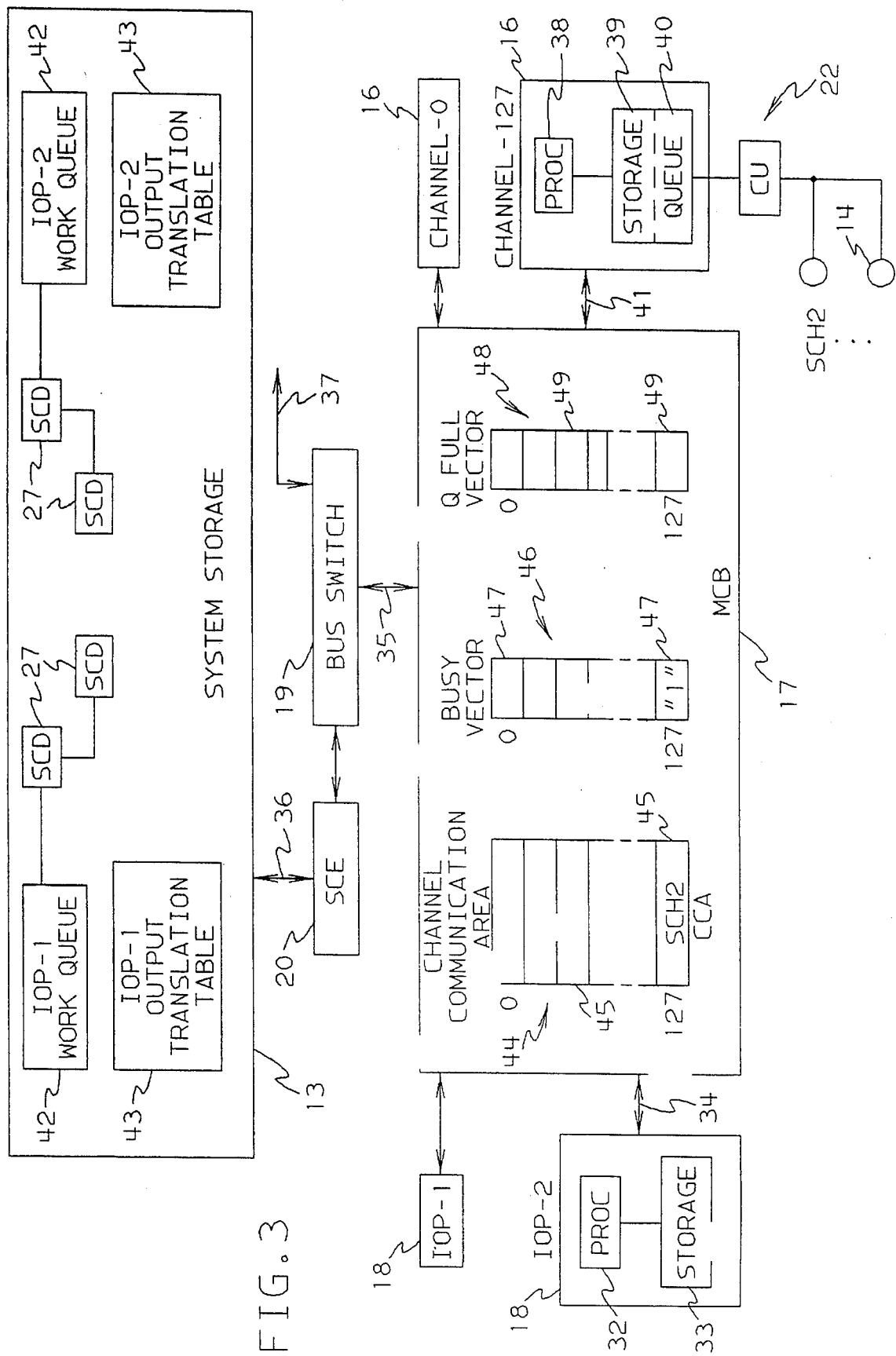
FIG. 3 is a block diagram including a showing of a busy vector and queue vector which are utilized in practicing the present invention.

FIG. 3 shows additional schematic representations of structure and control data used in the system of controlling input/output operations of a data processing system. Structure and control data previously identified and discussed have been given the same numeric designations used in previous Figures.

Each IOP 18, such as IOP-2, includes a program controlled Processor (PROC) 32 with storage 33. Path 34 provides access for PROC 32 and storage 33 to MCB 17, including structures to be described. Path 35 through Bus Switch 19 and path 36 provides access for PROC 32 and Storage 33 to control data included in System Storage 13. When the data processing system includes two sides as shown in FIG. 1, path 37 provides access to System Storage 13 and MCB 17 of the other side of the system.

Each Channel 16, such as Channel-127, includes a program controlled Processor (PROC) 38 and Storage 39. One addressable location in Storage 39 comprises a Queue 40 which functions to store one indication of work to be performed by the Channel 16 which is already busy performing work from a previous activation. A path 41 provides access between a PROC 38 and Storage 39 and MCB 17 including other structure to be described. Path 41 also provides communication between a Channel 16 and Storage 11 of FIG. 1 through MCB 17, path 35, Bus Switch 19, SCE 20, and path 36.

As I/O instructions are executed by a CPU 10 of FIG. 1, and a particular SCH number designated as in FIG. 2, work indicating means for each IOP 18 are created. The work indicating means is depicted in FIG. 3 as IOP-1 or IOP-2 Work Queue 42 which is effectively a first-in-first-out queue or string of SCD's 27 discussed in connection with FIG.2. As indicated earlier, designation of a SCH number in the Work Queue 42 provides the identification of an address in System Storage 13 of all of the control data included in an SCD 27. The data of an SCD 27 is available to the programmed PROC 32 of an IOP 18 or the programmed PROC 38 of a Channel 16.

System programming and or system design and use dictate how a data processing system should be configured. Each IOP 18 such as IOP-1 or IOP-2 in FIG. 3 has access to and can store in IOP Storage 33 an Output Translation Table 43. The Output Translation Tables 43 specify which IOP-1 or IOP-2 has control of which CHIPD's through which channels 16. CHIPD's 31 of an SCD 27 of FIG. 2 may not necessarily equate to channel numbers 0 through 127. As an IOP 18 is checking the busy or non-busy status of CHIPD's, it may be required to transfer an indication of work to another IOP 18 as indicated by the Output Translation Table 43.

The Multichannel Communicator Buffer (MCB) 17 includes three structural components depicted in FIG. 3 which are utilized in a preferred embodiment for practicing the present invention. The procedure for initiating the execution of an I/O work request by an IOP 18 at a Channel 16 is yet to be described. When that procedure completes, an IOP 18 accesses a Channel Communication Area (CCA) noted generally at 44 at a location 45 associated with the Channel 16 to execute the work request. The entry made in the location 45 identifies the SCH number that has been taken from the Work Queue 42 of the IOP initiating the execution.

When an IOP 18 has selected a path, determined the channel 16 to execute the instruction with reference to the Output Translation Table 43, and identified the SCH number in the location of the CCA 44 associated with the channel (such as SCH2 for Channel-127), the IOP 18 signals the channel 16 of that fact. PROC 38 of Channel-127 will retrieve the indication of work which identifies SCH2 from its location 45 in CCA 44 over path 41. Channel-127 uses the SCH2 designation to retrieve the control information from SCD 27 associated with SCH2 including the ORB Information 26 shown in FIG. 2. Channel control words comprising the channel program will be accessed from host memory 11 starting at the address designated by the ORB 26.

The preferred embodiment of the invention includes a busy indicating means in the form of a Busy Vector 46 which is comprised of a register including a binary bit position 47 associated with each Channel 16. Each channel 16 changes its associated bit to a binary "1" whenever the channel initiates new work with an I/O device and whenever the channel accepts a connection request from an I/O device. For example, when Channel-127 accepts the execution associated with SCH2, it changes the binary bit 47 associated with Channel-127 to a binary "1". As long as the channel 16 is actively communicating with an I/O device, the Busy Vector bit 47 remains set to "1". When the channel 16 is no longer communicating with any I/O device, the channel changes its associated bit 47 to a binary "0". The path selection process by IOP's 18, yet to be described, will use the binary state of the bit positions 47 of the Busy Vector 46.

The path selection process by an IOP 18 for another I/O work request might find all Channels 16 are busy for all possible CHPID's 31 of an SCD 27 for a designated SCH number. The previous description of the components of a Channel 16 included a Queue position 40 in the Storage 39 of a Channel 16. The full or empty status of the Queue 40 is indicated by a Q Full Vector register 48 comprised of a binary bit position 49 associated with each Channel 16 such as Channel-127. If an IOP 18 finds that the Queue 40 of Channel-127 is empty by examining the state of the position 49 of the Q Full Vector register 48 associated with Channel-127, it can initiate another execution by Channel-127 for another SCH number by placing an entry that identifies that SCH number in location 45 of CCA 44 associated with Channel-127. When signalled by the IOP 18, Channel-127 will place the SCH number in its Queue 40, and change the binary state of its location 49 of the Q Full Vector 48 to a binary "1". When Channel-127 completes the execution of the previous work for SCH2, it will start execution for the SCH number in Queue 40, and change the binary state of its position 49 in the Q Full Vector 48 back to binary "0". Its position 47 of the Busy Vector 46 will stay a binary "1" until completion of execution for the SCH number taken from its Queue 40, at which time Channel-127 will change its position 47 back to a binary "0".

Architecture requirements to select other paths on busy conditions call for a programmed PROC 38 of a Channel 16 to monitor the time that a SCH number is stored in a Queue 40. If a specified amount of time transpires and execution for the queued SCH number has not started, the channel 16 returns the SCH number to its position 45 in the CCA 44, and signals the IOP 18. The channel 16 also resets the associated binary bit position 49 of the Q Full Vector 48 to binary "0". This allows the IOP 18 to initiate another path selection process.

The introduction described the path selection process prior to the present invention. First, an IOP 18 could only test the busy status of a Channel 16 assigned to it per the settings of the Output Translation Table 43 shown in FIG. 3. CHPID's 31 of FIG. 2 would be tested in a specified round robin order. If an IOP 18 doing path selection found the next CHIPD 31 and associated Channel 16 were controlled by another IOP 18, the SCH number would be placed at the end of the IOP Work Queue 42 of the other IOP 18. This would take place without knowing if the Channel 16 was busy or not.

The prior path selection process also did not have the option of initiating execution for a SCH number by placing it in a Queue 40 at a Channel 16. With the busy status being the only criteria for path selection, a Channel 16 could become non-busy and busy again before either of two or more IOP's 18 examines the status based on the first-in-first-out examination of the Work Queues 42. This invention improves IOP 18 performance by removing the SCH number indication of work from its Work Queue 42, and reduces the need for communication with the other IOP 18, reducing bus usage.

When an IOP 18 starts to initiate an I/O work request and before it begins channel path selection, it examines the CU/Link/Device Status information 29 in the SCD 27 of the SCH number designated in the instruction. This information, maintained by other IOP 18 and Channel 16 programming, eliminates from path selection any CHPID 31, and thus Channel 16 that has a Control Unit 15 or I/O Device 14 previously found busy with another I/O work request. These Control Units 15 or Devices 14 may be under the control of other Channels 16 or data processing systems.

The round robin order in which Channels 16 are examined is specified by the placement order of the Channel 16 associated with the CHPID's 31 CHPID-0, CHPID-1, etc.

shown in the SCD 27 of FIG. 2. New with the present invention is the fact that any IOP 18 can examine the busy/not busy status of any Channel 16 by means of the Busy Vector 46 and the full/not full status of any Queue 40 by means of the Q Full Vector 48. This is also available to IOP's 18 associated with the other side of a data processing system shown in FIG. 1 over the path 37 shown in FIG. 3.

An IOP 18 searches through the channel busy status information in the Busy Vector 46 looking for a free channel 16, following the round robin search order. If there are any free channels, the IOP chooses the first one encountered in the rotation order and does one of the following:

1. In the case that the channel 16 is part of this IOP's group as indicated by the Output Translation Table 43, the IOP signals Channel 16 and places the entry identifying the associated SCH number in the channel's location 45 of the CCA 44;

2. In the case that the Channel 16 was not part of this IOP's group of channels, the IOP enqueues the request on the IOP Work Queue 42 of the IOP whose channel group includes the free channel as indicated by the Output Translation Table 43.

When all channels to a device are busy, the IOP searches the status information for the first channel in the round robin rotation order which has no requests queued in its one-deep Queue 40 as indicated by the Q Full Vector 48. If there are any free channel Queues 40, the IOP chooses the first one encountered in the rotation order and does one of the following:

1. In the case that the channel is part of this IOP's group of channels with which it can communicate as indicated by the Output Translation Table 43, the IOP enqueues the request in the channel's Queue 40 by placing the SCH number in the channel's location 45 of the CCA 44 and causing the Channel 16 to fetch the SCH number into its Queue 40;

2. In the case that the channel is part of another IOP's group of channels, the IOP enqueues the SCH number on the IOP Work Queue 42 of the other IOP that has a free Queue 40.

If all Channels 16 to a SCH number and associated I/O device 14 are busy and all the channel Queues 40 are full, the IOP 18 enqueues the SCH number back on its own IOP Work Queue 42.

Figure 4:
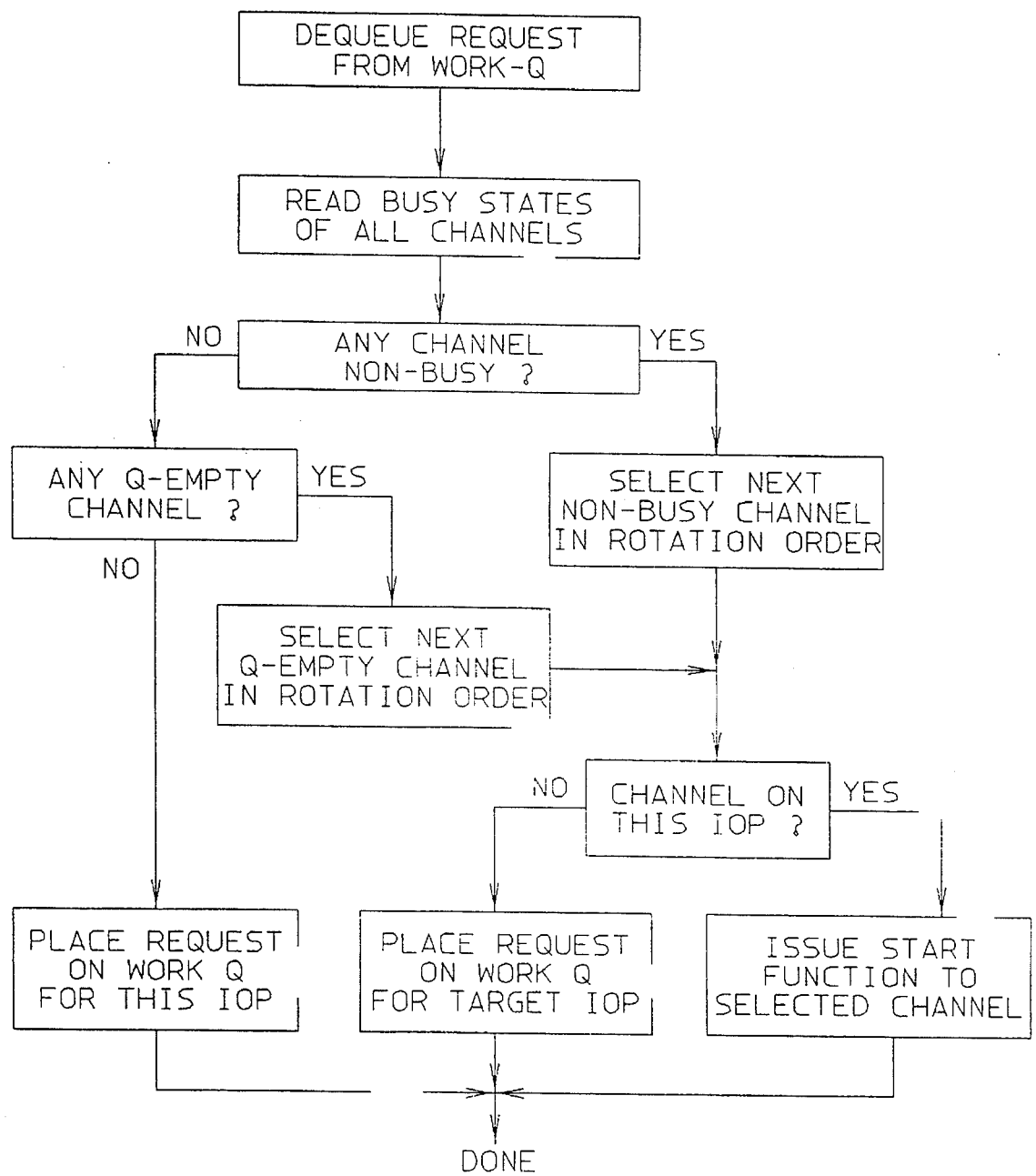
FIG. 4 is a data flow diagram of the steps taken to practice a preferred embodiment of the invention using the structure of FIG. 3.

The preceding steps of path selection are shown in the flow chart of FIG. 4.

By providing a one-position Queue 40 in each Channel 16, and allowing each IOP 18 to examine the busy status and queue status of all channels in a system, a much more intelligent selection of where to enqueue the work for a SCH can be made. The back and forth unproductive communication between IOP's in a data processing system is substantially reduced. Even in those systems where only one IOP 18 is required, the one-position Queue 40 significantly enhances the dispatch of I/O work requests to the channels 16.

Figure 5:
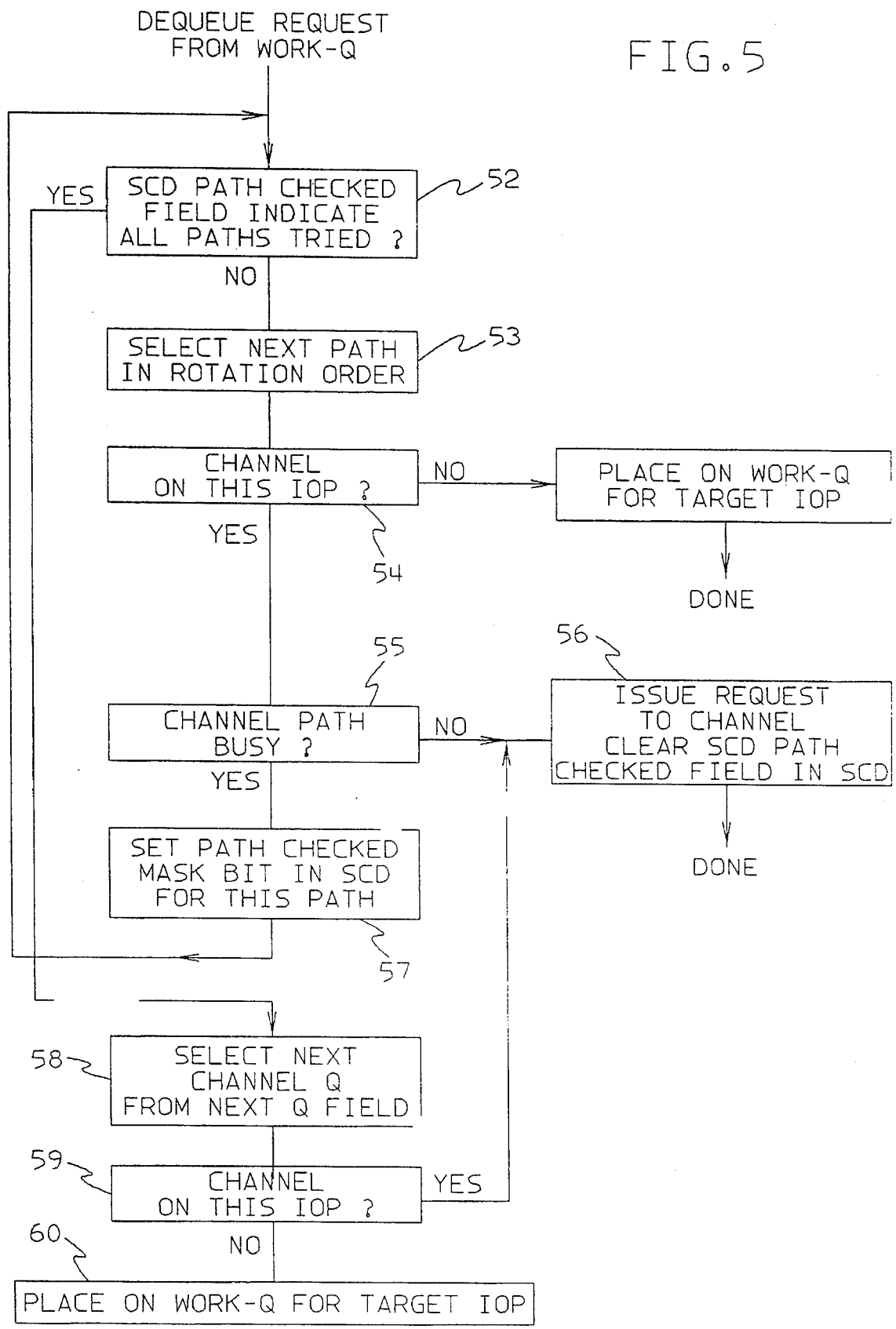
FIG. 5 is a data flow diagram of the steps taken to practice the present invention in another embodiment that does not include full access to the busy vector and does not include a queue vector shown in FIG. 3.

FIG. 5 is a flow diagram of an alternate path selection process where the need for a Q Full Vector 48 in the MCB 17 is eliminated. Programming of the PROC 32 of the IOP's 18 is changed to access fields of the Other Control Data 30 of the SCD of designated SCH numbers shown in FIG. 2. The new fields are an 8-bit Path Checked field 50, where each bit represents one of the eight CHPID's 31, and a 3-bit Next Queue counter 51. The Path Checked field 50 is used to record the fact that a Channel 16 associated with a CHPID has already been found to be busy during a path selection process. The binary bit of an associated CHPID-0 through CHPID-7 is made a binary "1" when the channel is found busy.

In FIG. 5 at 52 an IOP 18 checks the Path Checked field 50 to determine if all paths have been tried. If not, the next CHPID in round robin order is identified at 53. At 54 it is determined if the associated Channel 16 is controlled by this IOP. If not, the SCH number is placed on the IOP Work Queue 42 of the IOP that controls the Channel 16. If the Channel is on this IOP, the channel busy status is checked at 55 by examining the Busy Vector 46 of FIG. 3. If the Channel 16 is not busy, the entry identifying the SCH number is placed in the proper location 45 of the CCA 44 and execution initiated by signalling the Channel 16 by the IOP 18. This is shown at 56 of FIG. 5.

If the Channel 16 is found busy at 55, the IOP will set the corresponding binary bit in the Path Checked field 50 at 57 and return to 52. If all paths have been tried and found busy, the state of the Next Queue counter 51 will be used at 58 to select a Channel to receive the entry identifying the SCH number at the proper location 45 of the CCA 44 for placement in the Queue 40 of the Channel 16. If it is determined at 59 that the Channel 16 is controlled by this IOP, 56 will be entered to initiate the execution for the SCH number. If the Channel to receive the SCH number for queuing at a Channel 16 is not on this IOP, the SCH number will be placed in the IOP Work Queue 42 of the IOP that has control of that channel at 60. The Next Queue counter 51 will be incremented by the IOP. In this way, a random selection of a channel to receive a SCH number for placement in a Queue 40 of a Channel 16 is made. If the Channel 16 selected by the Next Queue counter 51 already has a SCH number in its Queue 40, it will signal a rejection of the attempt to do the queuing to the IOP, and the SCH number will be placed in the CCA 44 location 45 for that channel.

Figure 6:
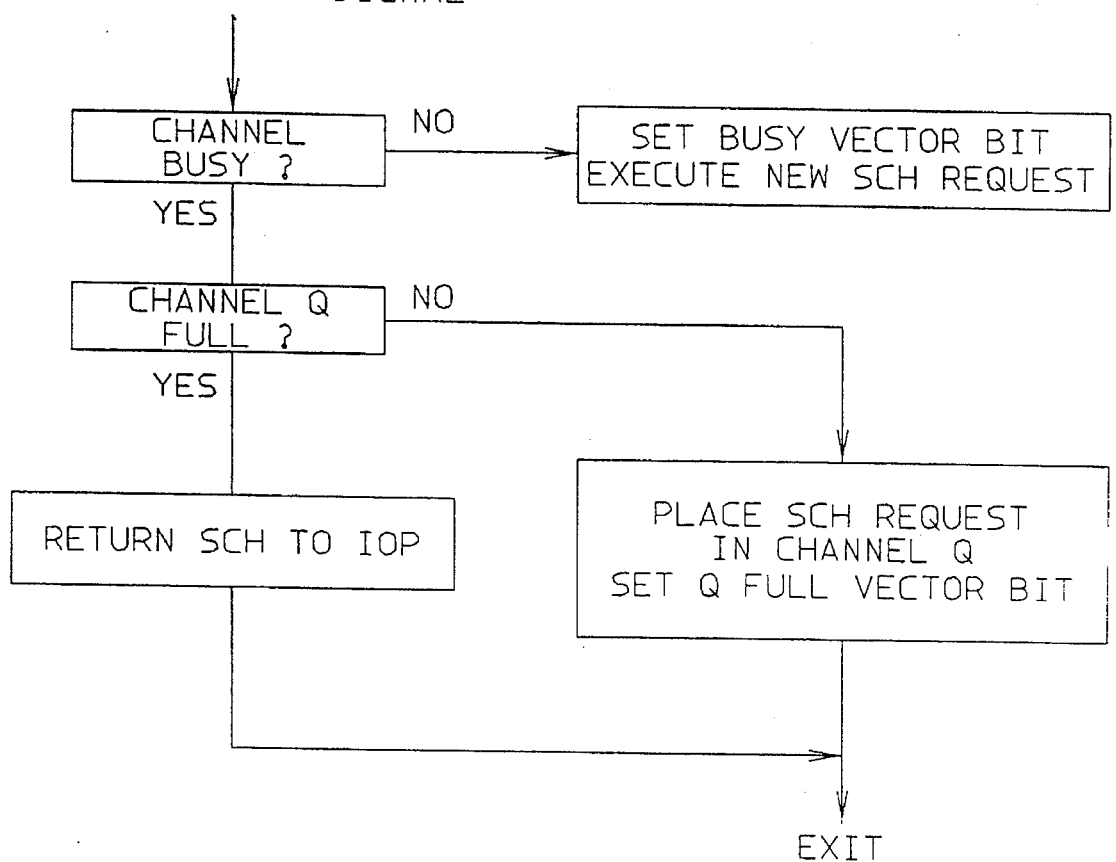
FIG. 6 is a data flow diagram of the steps taken by a channel to react to an indication of work to be done for executing the work or place the work in a one-deep queue.
Figure 7:
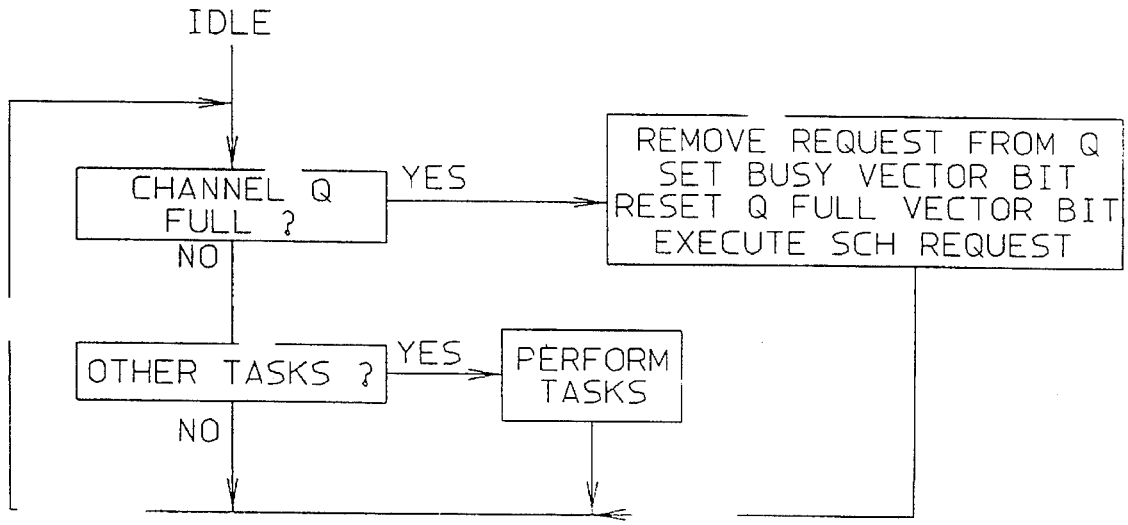
FIG. 7 is a data flow diagram of the steps taken by a channel to react to an indication of work to be done in a channels one-deep queue.

FIG. 6 and FIG. 7 show flow charts of functions performed in a Channel 16 based on new programming required for the PROC 38 of a Channel 16. The changes in programming reflect the action required in a Channel 16 to manipulate the Queue 40 in the channel, and the associated position 49 of the Q Full Vector 48. For the alternate approach of FIG. 7, the Channel 16 would not be programmed to manipulate locations 49 of the Q Full Vector register 48.

While we have illustrated and described the preferred embodiments of the invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A system for controlling input/output (I/O) operations between a host computer including a host processor and host memory, in communication with one or more I/O devices each identified by a unique number specified as part of I/O instructions executed by the host processor and communicating with the host computer through one or more channels, the host memory having a control area including control data associated with each of the one or more I/O devices, the control data including identification of the operation to be performed between the host computer and I/O device and identification of one or more channels available to establish a physical path between the I/O device and host computer (CHPID), said system comprising:

a queue in each channel for storing an indication of work to be performed by the channel for an I/O device after completing work for an I/O device currently in progress;

work indicating means in the control area of the host memory for indicating work to be performed with specified I/O devices and thereby identifying the control areas associated with the I/O devices, the indication of work being stored in said work indicating means by the host processor in response to execution of an I/O instruction;

busy indicator means for indicating the busy/not busy status of each channel;

queue status means for indicating the use status of said queues in the channels;

channel communication means including a plurality of locations, one for each channel, for storing an indication of work for the associated channel;

I/O controller means connected to the host computer for controlling the initiation of work to be performed between the host computer and I/O devices;

said I/O controller means including;
 means for accessing said work indicating means, and thereby the control data associated with an associated I/O device, for determining the channels having a physical path to the I/O device;
 means for accessing said busy indicator means and said queue status means;
 initiating means, responsive to said busy indicator means and said queue status means indicating the non busy status of a channel, or if all channels are busy, a channel having a said queue, creating a physical path to the I/O device, for transferring the indication of the work to said channel communication means location associated with the channel of the available physical path and removing the indication of work from said work indicating means; and
 means, responsive to said busy indicator means and said queue status means indicating the unavailability of any channel, and thus a physical path to the I/O device, for returning the indication of work to said work indicating means.

2. A system in accordance with claim 1 wherein each of the channels includes:

execution control means connected to at least one I/O device and said channel communication means, including means for controlling an attached I/O device, and means for accessing the indication of work for the I/O device from said channel communication means at said location associated with the channel.

3. A system in accordance with claim 2 wherein:

said work indicating means is comprised of one or more work queues for receiving and storing indications of work from the host processor;

said I/O controller means further includes;
 one or more I/O processor (IOP) means, each said IOP means being associated with a particular one of said work queues, and each IOP controlling specified ones of the channels.

4. A system in accordance with claim 3 wherein said IOP includes:

means connected to said busy indicator means for determining the busy/not busy status of each channel identified by the CHPID's of the control data associated with an I/O device identified by the indication of work in said work queue associated with this said IOP, and making the determination in a specified round robin order of the channels;

means, responsive to the not-busy status of the channel next in the round robin order, which channel is controlled by this said IOP, for storing the indication of work in said channel communication means in said location associated with the channel; and means, responsive to the not-busy status of the channel next in the round robin order, which channel is controlled by another said IOP, for storing the indication of work in said work queue of the another said IOP.

5. A system in accordance with claim 4 wherein said IOP further includes:

means connected to said queue status means, responsive to the busy status of all channels identified by the CHPID's of the control data associated with an I/O device identified by the indication of work in said work queue of this IOP, for determining the identity of a said queue in a channel identified by the CHPID's;

means operative when the identified channel is controlled by this said IOP, for storing the indication of work in said channel communication means in said location associated with the identified channel;

means operative when the identified channel is controlled by another said IOP, for storing the indication of work in said work queue of the another said IOP.

6. A system in accordance with claim 5 wherein:

said busy indicator means includes,
 a binary bit position associated with each channel, the binary state of which indicates the busy/not busy status of the channel;

said queue status means includes,
 queue full vector means comprised of a binary bit position associated with each channel, the binary state of which indicates the full/not full status of said queue in the channel;

said execution control means of each channel includes,
 means connected to said busy indicator means for changing the binary state of said binary bit position of said busy indicator means as indications of work are accessed from said channel communication means for execution and as executions are completed,
 means connected to said queue full vector means for changing the binary state of said binary bit position of said queue full vector means as indications of work are accessed from said channel communication means for storing in said queue of the channel and as indications of work are removed from said queue of the channel.

7. A system in accordance with claim 5 wherein:

said queue status means is comprised of a next queue counter in the control data associated with an I/O device, said next queue counter identifying the channel associated with the CHIPD's in the control data to receive the indication of work for storage in the said queue of the channel identified;

said IOP further includes means for incrementing said next queue counter after determining the channel to receive the indication of work; and said execution control means of each channel further includes means operative on receipt of the indication of work for storage in said queue, and responsive to the existence of an indication of work in said queue, for returning the indication of work to said channel communication means.

8. A system in accordance with claim 6 wherein:

said execution control means of each channel includes;

timing means, operative when an indication of work is stored in said queue and responsive to the elapse of a predetermined time, for returning the indication of work to the associated said location of said channel communication means and changing the binary state of said binary bit position of said queue full vector to indicate the not full status of said queue of the associated channel.

* * * * *

UNITED STATES PATENT AND TRADEMARK OFFICE
CERTIFICATE OF CORRECTION

PATENT NO. : 5,548,791
DATED : Aug. 20, 1996
INVENTOR(S) : Daniel F. Casper et al.

It is certified that error appears in the above-identified patent and that said Letters Patent is hereby corrected as shown below:

On the title page, and column 1, line 1:
   [54] Title             "INPUT/OUTPUT CONTROL SYSTEM WITH PLURAL CHANNEL PATHS TO I/O DEVICES" should be --I/O CONTROL SYSTEM FOR SELECTIVELY ASSIGNING WORK TO AN AVAILABLE CHANNEL BASED UPON STATUS THEREOF AND AVAILABLE SLOT OF ITS ASSOCIATED CHANNEL QUEUE--

Signed and Sealed this

Third Day of December, 1996

Attest:

BRUCE LEHMAN

*Attesting Officer*          *Commissioner of Patents and Trademarks*